E. P. SMITH.
MATCH SAFE, IGNITER, AND CIGAR CUTTER.
APPLICATION FILED NOV. 15, 1910.
1,008,994.
Patented Nov. 14, 1911.
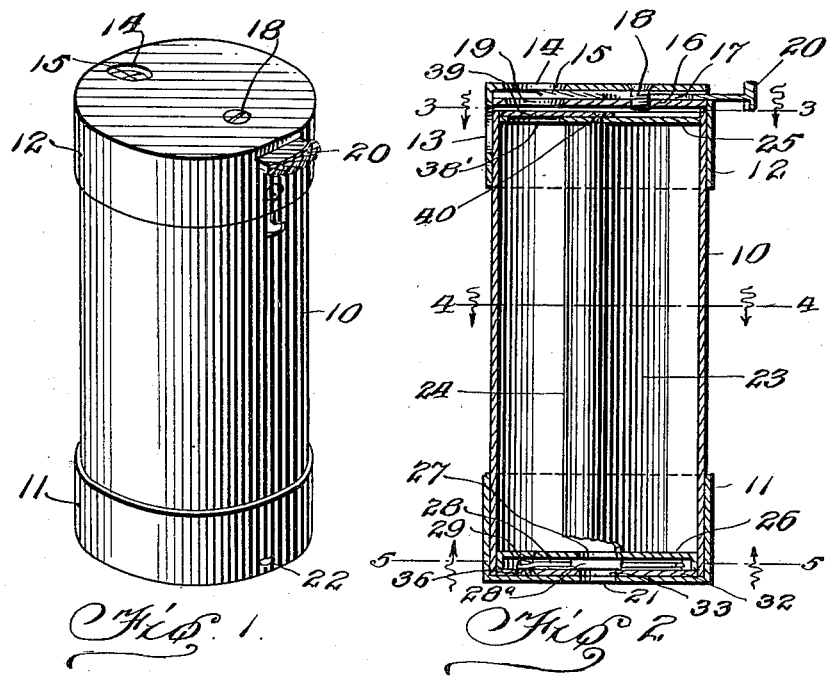
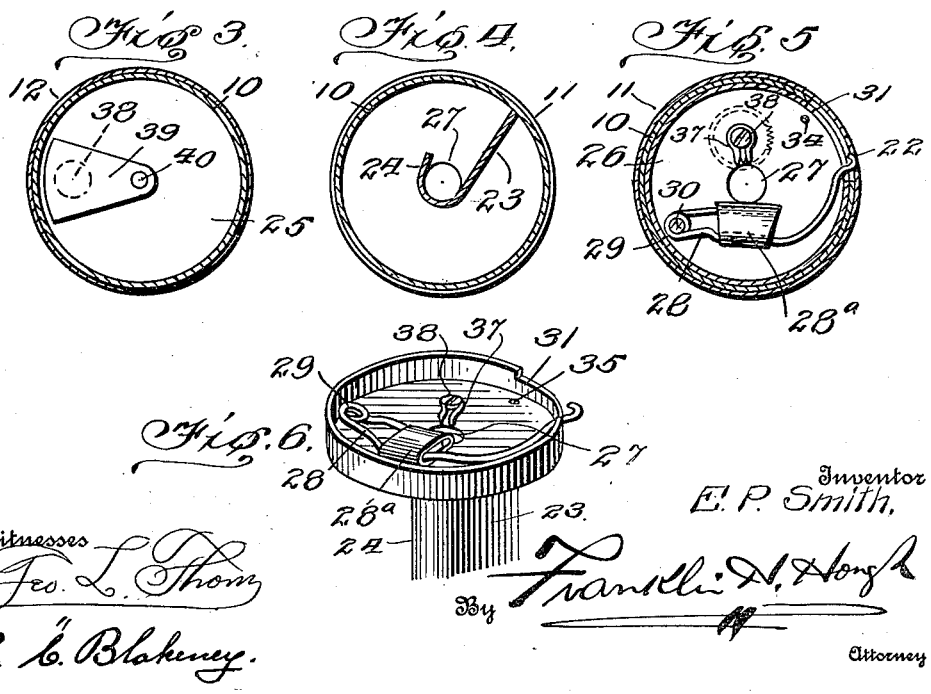

UNITED STATES PATENT OFFICE.

EUGENE P. SMITH, OF WARREN, PENNSYLVANIA, ASSIGNOR TO NETTIE S. CHALKLEY, OF DREWRYS BLUFF, VIRGINIA.

MATCH SAFE, IGNITER, AND CIGAR-CUTTER.

1,008,994.   Specification of Letters Patent.   Patented Nov. 14, 1911.

Application filed November 15, 1910. Serial No. 592,571.

*To all whom it may concern:*

Be it known that I, EUGENE P. SMITH, a citizen of the United States, residing at Warren, in the county of Warren and State of Pennsylvania, have invented certain new and useful Improvements in Match Safes, Igniters, and Cigar-Cutters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in match safes and has for its object to provide a combination match safe, igniter and cigar cutter, and a further object of making a positive discharge of a match when desired, and a positive ignition thereof when withdrawn from the case.

Other objects will be apparent from the following specification appended claims and drawings thereof, in which:—

Figure 1 is a perspective view of the device. Fig. 2 is a longitudinal sectional view. Fig. 3 is a cross sectional view on the line 3—3 of Fig. 2. Fig. 4 is a similar view as on the line 4—4 of Fig. 2. Fig. 5 is a similar view as on the line 5—5 of Fig. 2. Fig. 6 is a perspective view of the match delivering end with parts broken away.

Referring more particularly to the drawings there is shown a cylindrical casing 10 having a cap 11 on the lower end and a cap 12 on the upper end, the cap 11 being rotatable on the casing 10 for a part of a revolution while the cap 12 is secured thereto by a bayonet slot and screw and has both a longitudinal and rotatable movement.

The cap 12 has an opening 13 in the circumference thereof and another opening 14 in its end, said opening in the end of the cap serving as a medium through which the casing is supplied with matches. A cutting blade 15 is slidable between the end of the cap and a false end 16 and serves as a cigar cutter. The cutter is slotted as at 17 for the reception of the screw 18 which guides the cutter and retains the false end 16 in place, the latter being notched as at 19 forming an opening which registers with the opening 14 in the cap. Said cutter has the thumb piece 20 on the outer end thereof affording means whereby the cutter may be moved back and forth. The cap 11 on the opposite end of the casing is provided with an aperture 21 in the center thereof and is also provided with a circumferential aperture 22, the function of these openings to be described later.

Within the casing is a flat member 23 having a curved inner edge 24, a disk 25 at one end and a cup 26 at its opposite end, the function of the flat portion being to collect matches as the casing is rotated and deliver the same to the curved inner edge which in turn delivers the match through an opening 27 in the bottom of the cupped end 26. Within this cup 26 is a spring 28 which is coiled as at 29 to provide a fulcrum, said spring having a band 28ª about the same to guide a match when being withdrawn and to close the opening when so desired. One end of the spring which is bent upon itself passes through a recess 31 in said cup and is arranged to bear in the opening 22 in the cap 11. Said cup is provided with an additional head 32 which has a central opening 33 in alinement with the opening 27, and a pin 34, intended to be inserted in an opening 35 in the cup 26 said pin limiting the movement of the spring 28 in one direction. The screw 30 which holds the spring 28 passes through an opening 36 in the head 32 and serves to retain the head against accidental misplacement. Within the cup is a U-shaped clip 37 which is secured to the cup by a screw 38 and is provided with prongs against which the head of a match is adapted to contact as it is withdrawn from the casing, thereby affording means for igniting the match. The disk 25 at the opposite end of the member 23 is provided with an opening 38′ and a closure 39 for said opening, said closure consisting of a flat leaf pivoted to the disk 25 at 40 and allowed to swing free about said pivot point.

In manipulating the device, the slide 20 is withdrawn to uncover the opening 14 and the member 39 swung from over the opening 38′, thus allowing the matches to be inserted within the casing.

To withdraw and ignite a match, the casing, when held in a substantially horizontal position, is rotated in the proper direction, a revolution, then tilted to an upright or inclined position, the lower cap rotated with respect to the casing when the stem of the match will slide out, the cap is then rotated in the reverse direction until the match is frictionally held. As the match is withdrawn the band on the spring causes the head of the match to engage the prongs of the U shaped clip and become ignited, then the band is sprung into the path of the opening of said cap and prevents further passage of other match stems.

To use as a cigar cutter the cap on the opposite end is rotated and slid away from the casing within the limit of the bayonet slot, thereby providing a chamber between the head of said cap and end of the casing, the cutter is used as in common devices, the cut end falling through the opening side wall of the cap.

Having thoroughly described my invention, I claim:—

1. A match safe comprising a casing a collecting member within said casing, a cap on each end of said casing one of said caps being slidable longitudinally on said casing, a false head within said cap a cutter blade slidable between said heads, openings in said heads to receive the pointed end of a cigar and another opening in the wall of said cap, the other of said caps having a central opening in the head thereof, a second opening in the wall thereof adjacent to the head, said cap being rotatable for a portion of a revolution, a cup shaped head secured to the end of the collecting member within said casing, a head secured to said cupped head, a central opening through each of said heads, a spring within said cup fulcrumed on a screw connecting the heads together a band on said spring, a prong within said cup arranged to ignite a match when withdrawn through the central opening and means to bring the band carried by said spring into and out of the path of the openings.

2. A match safe comprising a casing, a cap on each end thereof, a cigar cutter carried by one of said caps, a collecting member within said casing, a cup carried at one end of said member, a head for said cup, central openings through said cup and head, a spring within said cup, a band on said spring, one end of said spring passing through a recessed portion in cup and casing, a pronged clip within said cup, the cap adapted by a rotary movement to bring the band on the spring either in the path of the openings through the cup and cap, or in bearing relation with the stem of a match pressing the same against the pronged clip.

In testimony whereof I hereunto affix my signature in the presence of two witnesses.

EUGENE P. SMITH.

Witnesses:
R. G. CHAPEL,
FLORENCE SANDBLADE.

---

Copies of this patent may be obtained for five cents each, by addressing the "Commissioner of Patents, Washington, D. C."